Sept. 12, 1967  E. A. SAVAGE  3,340,640
VEHICLE LICENSE PLATE HOLDER AND LOCKING MEANS
Filed Oct. 11, 1965  2 Sheets-Sheet 1
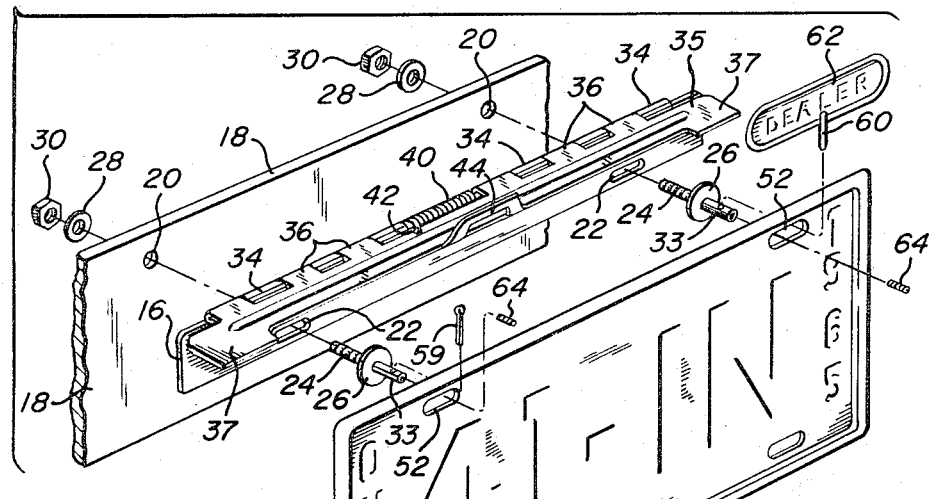
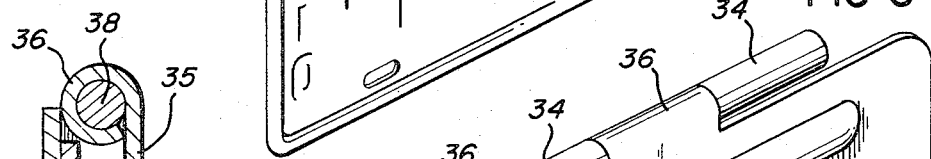
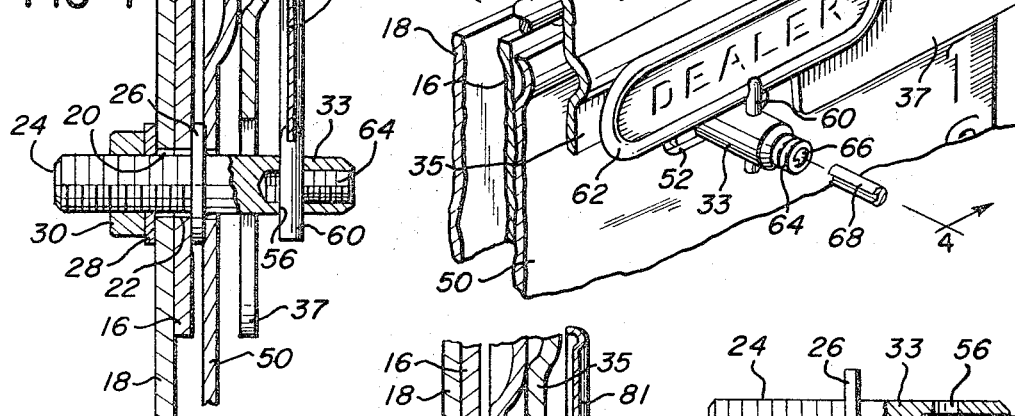
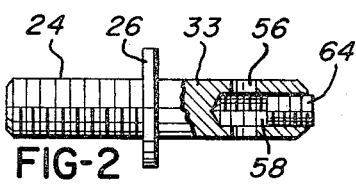
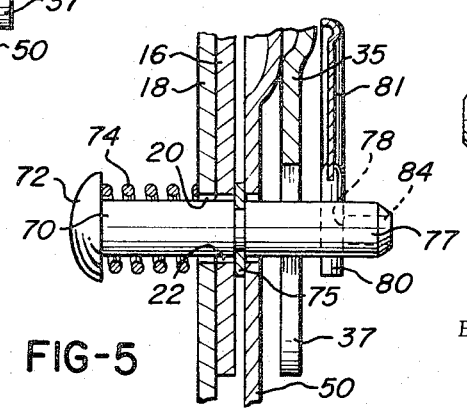
INVENTOR.
EVERETT A. SAVAGE
BY *William R Jacox*
ATTORNEY

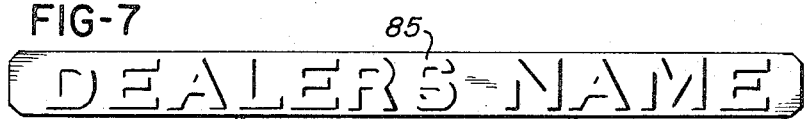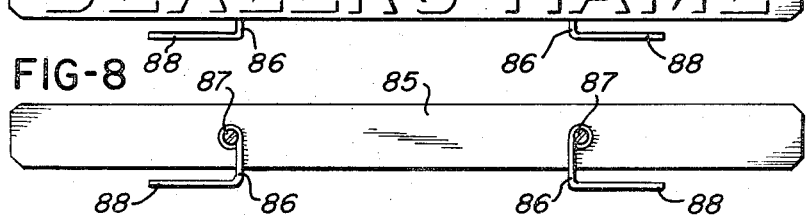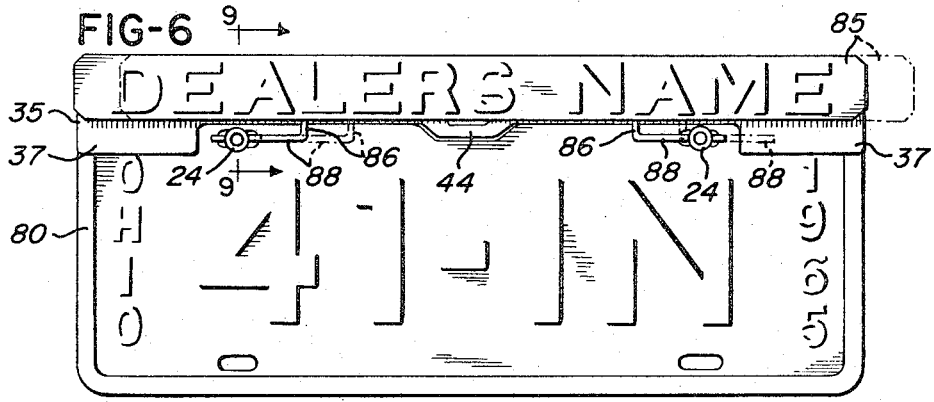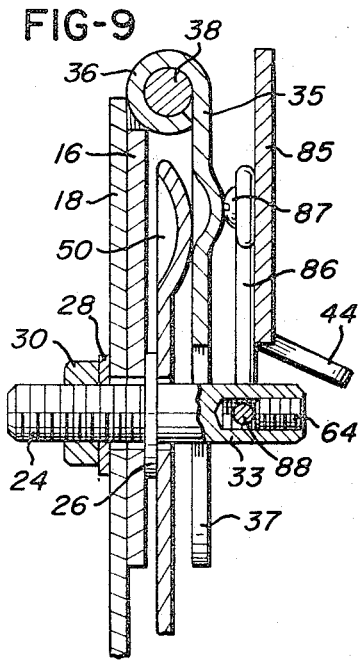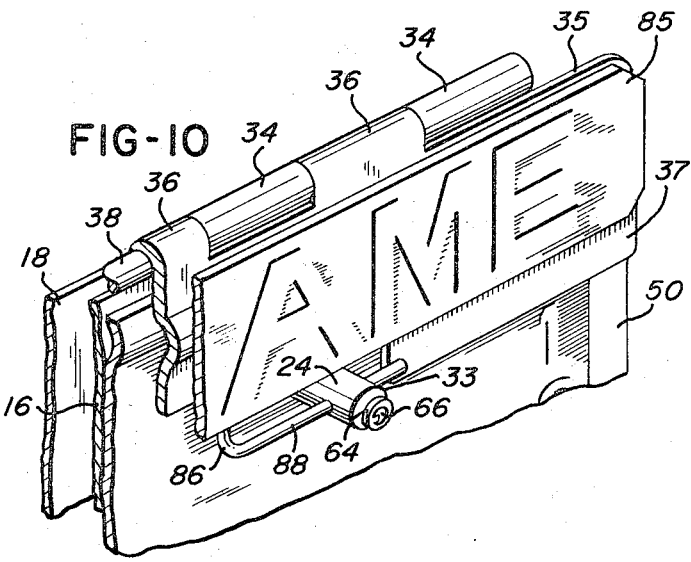

United States Patent Office 3,340,640
Patented Sept. 12, 1967

3,340,640
VEHICLE LICENSE PLATE HOLDER AND
LOCKING MEANS
Everett A. Savage, R.R. 1, Spring Valley, Ohio 45370
Filed Oct. 11, 1965, Ser. No. 494,583
8 Claims. (Cl. 40—209)

ABSTRACT OF THE DISCLOSURE

This invention relates to a vehicle license plate holder and locking means. The invention relates more particularly to means for releasably securing a license plate to a vehicle so that a special key or tool is required for removal of the license plate from the vehicle.

Related application

This application relates to my copending patent application Ser. No. 451,172 filed Apr. 27, 1965.

Background of the invention

It is an object of this invention to provide a vehicle license plate holder by which a license plate can be easily and readily attached to a vehicle.

Another object of this invention is to provide a license plate holder by which a license plate can be locked to a vehicle.

Other objects and advantages reside in the construction of the invention, combinations thereof, the method of manufacture, and the mode of operation, as will become more apparent from the folowing description.

In the drawings:

FIGURE 1 is a perspective exploded view of a license plate holder of this invention and a license plate for retention thereby, showing elements of the license plate holder in position to receive the license plate.

FIGURE 2 is an enlarged side view, with parts broken away, of a stud member of a license plate holder of this invention.

FIGURE 3 is an enlarged fragmentary perspective view showing the license plate holder with a license plate retained thereby. This figure shows the locking means of this invention in an unlocked condition.

FIGURE 4 is a sectional view taken substantially on line 4–4 of FIGURE 3, but showing the locking means in locked condition.

FIGURE 5 is a fragmentary sectional view, drawn on substantially the same scale as FIGURE 4, showing a modification in a portion of a license plate holder of this invention.

FIGURE 6 is a front elevational view showing another modification in the license plate holder of this invention.

FIGURE 7 is a front elevational view showing a portion of the structure of FIGURE 6.

FIGURE 8 is a rear elevational view of the structure of FIGURE 7.

FIGURE 9 is an enlarged sectional view taken substantially on line 9–9 of FIGURE 6.

FIGURE 10 is an enlarged fragmentary perspective view of a portion of the apparatus of FIGURE 6.

Referring to the drawings in detail, a license plate holder of this invention comprises an elongate support member or strip 16 which is adapted to be attached to a portion or part 18 of a vehicle. The part 18 may be a bumper of a vehicle or any other part or portion thereof to which a license plate may be attached. The part 18 is shown as being provided with holes or apertures 20.

The support member 16 is provided with slots 22. A portion of each of the slots 22 is in alignment with one of the holes or apertures 20 of the part 18. Preferably, the support member 16 is attached to the part 18 by means of studs 24. Each stud 24 has a head 26 intermediate the ends thereof. Each stud 24 extends through one of the slots 22 of the support member 16 and through the aperture 20 which is in alignment therewith. A washer 28 encompasses the stud 24 and a nut 30 is threadedly attached to the stud 24 as shown in FIGURE 4. Thus, the head 26 engages the support member 16 and retains the support member 16 in firm engagement with the part 18.

Each stud 24 has a stem portion 33 extending from the head 26 in a direction opposite from the nut 30, for a purpose discussed below.

The upper edge portion of the support strip 16 has a plurality of spaced-apart arcuate knuckles 34. A clamping member or strip 35 has arcuate knuckles 36 which are positioned in alignment with the knuckles 34 of the support strip 16. A rod 38 extends through the knuckles 34 and 36 for pivotal attachment of the clamping member 35 to the support member 16.

A helical spring 40, shown in FIGURE 1, encompasses the rod 38 and has one end thereof secured by any suitable means (not shown) against movement with respect to the support member 16. The spring 40 also has an end 42 which engages the clamping member 35 and urges pivotal movement of the clamping member 35 toward the support member 16.

The clamping member 35 has a tab 44 at the central portion extending laterally therefrom. The clamping member 35 also has flaps or extensions 37 adjacent the ends thereof.

For attachment of a license plate 50 to a license plate holder of this invention, the clamping member 35 is pivotally moved angularly with respect to the support member 16, as shown in FIGURE 1, The clamping member 35 is preferably moved angularly by manually gripping the tab 44. The license plate 50 has holes or slots 52, each of which receives the stem portion 33 of one of the studs 24, as the stem 33 extends through the slot 52. The license plate 50 is moved into engagement with the support member 16. Then the clamping member 35 is permitted to pivotally move toward the support member 16. Thus, the license plate 50 is clamped between the clamping member 35 and the support member 16, as the license plate 50 is retained upon the stems 33 of the studs 24, as shown in FIGURE 4.

As shown in FIGURE 2, the stem portion 33 of each stud 24 has a passage 56 extending transversely therethrough. The stem 33 also has a threaded bore 58 extending longitudinally therein. The bore 58 extends from the end of the stem 33 into the passage 56.

The passage 56 in the stem 33 is adjacent the end thereof so that as the license plate 50 is clamped between the clamping member 35 and the support member 16, the passage 56 is intermediate the clamping member 35 and the end of the stem 33.

A cotter pin 59, shown in FIGURE 1, may be inserted into the passage 56 or a pin 60, also shown in FIGURE 1, may be inserted into the passage 56. The pin 60 has a panel 62 attached thereto. FIGURES 3 and 4 show the pin 60 and the panel 62. After the pin 60 is inserted into the passage 56, as shown in FIGURE 3, a locking screw 64 within the threaded bore 58 is threadedly moved from the position thereof shown in FIGURES 2 and 3, toward the passage 56, as shown in FIGURE 4. Thus, the locking screw 64 is tightened against the pin 60 within the passage 56, as shown in FIGURE 4. Thus, the pin 60 is secured with respect to the stem 33.

Preferably, the locking screw 64 has a special socket 66, shown in FIGURE 3, into which a special tool or key member 68 is inserted for rotation of the locking screw 64. The key member 68 and the socket 66 are specially formed. Thus, when the locking screw 64 is in firm engagement with the pin 60 within the passage 56, as shown in FIGURE 4, it is difficult to rotate the locking screw 64 without use of the key member 68.

When the pin 60 is disposed within the passage 56 as shown in FIGURE 4, an upwardly extending portion of the pin 60 and the panel 62 are closely adjacent the clamping member 35. Therefore, the clamping member 35 cannot be pivotally moved in a direction from the support member 16. Thus, the license plate 50 cannot be removed from the stems 33. Thus, the license plate 50 is secured to the license plate holder of this invention and cannot be removed therefrom without the use of the key member or tool 68.

The panel 62 which is attached to the pin 60 may serve as a sign which bears an automobile dealer's name thereon for advertising purposes and the like.

FIGURE 5

FIGURE 5 illustrates a modification of this invention. A stud 70 is employed in this modification. The stud 70 has a head 72. The stud 70 is shown in combination with the support member 16, the clamping member 35 and the license plate 50 discussed above.

The part 18 to which the support member 16 is attached may be of considerable thickness or the part 18 may have slight thickness. The stud 70 has considerable length so that the stud 70 will extend through a part 18 which may be of considerable thickness. The stud 70 also is adaptable for use with a part 18 which may have slight thickness. A spring 74 encompasses the stud 70 and is disposed between the head 72 and the rear surface of the part 18. A clip 75 is attached to the stud 70 intermediate the ends thereof and exterior of the support member 16. The spring 74 urges the clip 75 into engagement with the support member 16 so that the support member 16 is retained in firm engagement with the part 18.

The stud 70 has a stem 77 provided with a transverse passage 78 therethrough, similar to the passage 56 of the stud 24. A pin 80 is disposed within the passage 78. A panel 81 is carried by the pin 80. A locking screw 84, similar to the locking screw 64 of FIGURE 2, is threadedly mounted within the stem 77 and is in firm engagement with the pin 80. Thus, the license plate 50 cannot be removed from the license plate holder of this invention. Furthermore, the stud 70 cannot be removed from the support member 16 and from the part 18 without removal of the pin 80 from the step 77. Thus, as the pin 80 is locked to the stem 77, the license plate 50 is locked to the support member 16, and the support member 16 is locked to the part 18. Therefore, the license plate 50 is locked to a vehicle which includes the part 18.

FIGURES 6-10

FIGURES 6-10 illustrate another modification in the structure of this invention. The structure includes the support member 16 and the clamping member 35 which are attached to the part 18, in the manner discussed above, with respect to FIGURES 1-4. A stud 24 extends through the support member 16 and through the part 18. A nut 30 and a washer 28 encompass the stud 24 as shown in FIGURE 9.

A pair of studs 24, shown in FIGURE 6, extend through the license plate 50. As shown in FIGURE 9, the stud 24 is rotated substantially 90 degrees with respect to the rotative position thereof shown in FIGURE 4. Thus, the passage 56 through the stem 33 of the stud 24 is horizontal in FIGURE 9, rather than vertical.

A panel 85 has attached thereto, by means of screws 87, a pair of pin members 86. Each pin member 86 has a part 88 which is substantially parallel with the panel 85.

The part 88 of each pin 86 is adapted to be inserted into a passage 56 of one of the studs 24. Axial movement of the panel 85 as illustrated in FIGURE 6 is required for insertion of the portion 88 of both of the pins 86 into both of the studs 24. The part 88 of each pin 86 is locked to its respective stud 24 by means of a locking screw 64 in the manner discussed above.

The panel 85 and the screws 87 attached thereto therefore are secured in juxtaposition with the clamping member 35, as shown in FIGURE 9. Thus, the clamping member 35 cannot be pivotally moved with respect to the support member 16. The license plate 50 cannot be removed from the license plate holder without the unlocking of both of the locking screws 64. Thus, the license plate 50 is secured to the license plate holder of this invention. A dealer's name may be applied to the panel 85 as illustrated in FIGURES 6 and 7.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

The invention having thus been described, the following is claimed:

1. License plate holder apparatus for a vehicle comprising:
    an elongate support strip for attachment to a portion of a vehicle, the suport strip being provided with a plurality of apertures therethrough,
    a plurality of stud members, there being one stud member for each of the apertures, each stud member having a body portion extending through its respective aperture, the stud member being attached to a portion of a vehicle, each stud member having a head intermediate the ends thereof and in engagement with the support strip for securing the support strip to said portion of a vehicle,
    each stud member having a stem extending from the head thereof in a direction opposite the body portion thereof, the stem having a transverse passage therein, the stem having a threaded bore leading to the passage,
    a clamping strip pivotally attached to the support strip,
    a license plate positioned intermediate the clamping strip and the support strip, the stem of each of the studs extending through the license plate,
    the clamping strip having a portion positioned adjacent the stem of each of the studs when a license plate is positioned intermediate the clamping strip and the suport strip,
    a plurality of pins, there being a pin extending into the passage of the stem of each of the studs, each pin having a portion adjacent said portion of the clamping strip and preventing movement of the clamping strip with respect to the support strip,
    a plurality of locking screws, there being a locking screw extending into the bore of the stem of each stud, the locking pin extending into the passage of the stem and engaging the pin therewithin so that the pin cannot be removed from the stem, the license plate thus being locked in its position intermediate the clamping strip and the support strip.

2. License plate holder apparatus for a vehicle comprising:
a support member,
a clamping member pivotally attached to the support member,
the support member and the clamping member being adapted to receive a license plate therebetweeen when the clamping member is pivotally positioned substantially parallel with the support member,
a stud member extending through the support member, the stud member being attached to a portion of a vehicle, the stud member having a head in engagement with the support member so that the support member is intermediate the head and said portion of a vehicle, the support member thus being attached to said portion of a vehicle,
the stud member having a stem provided with an opening therein,
the stem extending through the license plate as the license plate is positioned between the support member and the clamping member,
a pin positioned within the opening in the stem, the pin having a part adjacent the clamping member and preventing pivotal movement of the clamping member in a direction from the support member,
locking means carried by the stem and positionable within the opening and locking the pin with respect to the stem,
the license plate thus being locked in its position intermediate the clamping member and the support member.

3. Locking apparatus for securing a license plate to a portion of a vehicle comprising:
a stud member attachable to a portion of a vehicle, the stud member having a stem portion provided with an opening therein, the stem portion of the stud member being adapted to extend through a license plate,
abutment means positioned within the opening of the stem portion, the abutment means having a part spaced from the stem portion and preventing movement of the license plate from the stem portion of the stud member,
locking means movable into the opening of the stem portion for engaging said abutment means for locking said abutment means with respect to the stem portion.

4. License plate holder apparatus for locking a license plate to a part of a vehicle, comprising:
a stud adapted to extend through a part of a vehicle, the part having a front surface and a rear surface, the stud having a head adjacent the rear surface of said part,
a spring encompassing the stud intermediate the head and the rear surface of said part of a vehicle, the stud having a stem at a portion thereof opposite the head thereof, the stem being adapted to extend through a license plate, the stem being provided with an opening therein,
abutment means positioned within the opening and extending from the stem and preventing removal of the license plate from the stem,
releasable locking means carried by the stem within said opening thereof and engageable with said abutment means and preventing removal of said abutment means from the opening in the stem,
the license plate thus being locked to said part of the vehicle, and a special key or tool movable into the opening of the stem for engagement with the locking means for release thereof for removal of the abutment means from the stem and for reengagement with the locking means for locking thereof.

5. License plate holder apparatus comprising:
support means,
clamping means pivotally attached to the support means,
a stud carried by the support means, the stud having a stem extending in a direction away from the support means, the stem having an opening therein,
abutment means positioned within the opening of the stem and having an abutment part adjacent the clamping means and preventing pivotal movement of the clamping means with respect to the support means,
releasable locking means carried by the stem and engageable with said abutment means for preventing movement of said abutment means with respect to the stem.

6. License plate holder apparatus comprising:
a support member,
a clamping member pivotally attached to the support member,
a pair of spaced-apart studs extending through the support member and having a portion adjacent the clamping member,
each of the studs having a passage therethrough, the passage of one stud being aligned with the passage of the other stud,
a panel having a pair of pins extending therefrom, each of the pins being positioned within the passage of one of the studs,
each pin having a portion adjacent the clamping member and engageable thereby and limiting pivotal movement of the clamping member with respect to the support member,
means carried by each stud and engageable with the pin within the passage thereof for securing the pin with respect to the stud.

7. A license plate holder comprising:
support means,
clamping means,
hinge means pivotally joining the support means to the clamping means so that the clamping means is pivotal with respect to the support means, the support means and the clamping means being adapted to retain a license plate therebetween when the clamping means is in a given pivotal position with respect to the support means,
retainer means attached to the support means, the retainer means having a part extending through a license plate which is clamped between the clamping means and the support means, the retainer means including a stem provided with an opening therein, abutment means within the opening of the stem and positioned adjacent the clamping means and engageable thereby for limiting pivotal movement of the clamping means with respect to the support means for maintaining the license plate with respect to the support means and the clamping means, and a special tool movable into the opening of the stem and engageable with the abutment means for release thereof from the stem and for engagement thereof with the stem.

8. A holder for attaching a license plate to a portion of a vehicle comprising:
a support member,
attachment means for attaching the support member to said portion of the vehicle,
a clamping member pivotally attached to the support member for pivotal movement with respect thereto, the clamping member and the support member being adapted to retain a license plate therebetween when the clamping member is in a given pivotal position with respect to the support member, the attachment means including a stud having a transverse passage therethrough, the stud having a longitudinal bore in communication with the passage, abutment means positioned within the passage and extending from the stud and limiting pivotal movement of the clamping member with respect to the support member, a locking screw movable within the bore and engageable with the abutment means for locking the abutment means with respect to the stud.

References Cited

UNITED STATES PATENTS

| 1,453,658 | 5/1923 | Clough | 40—13 |
| 1,516,547 | 11/1923 | Powell | 40—202 X |
| 2,066,694 | 1/1937 | Padavic | 40—202 |
| 2,177,215 | 10/1939 | Hodgkinson | 40—200 |
| 2,857,696 | 10/1958 | Barrow | 40—11 |

EUGENE R. CAPOZIO, *Primary Examiner.*

W. J. CONTRERAS, *Assistant Examiner.*